April 24, 1951 S. G. GILLICH ET AL 2,550,146
VARIABLE CUTTING DEVICE
Filed June 30, 1949 3 Sheets-Sheet 1
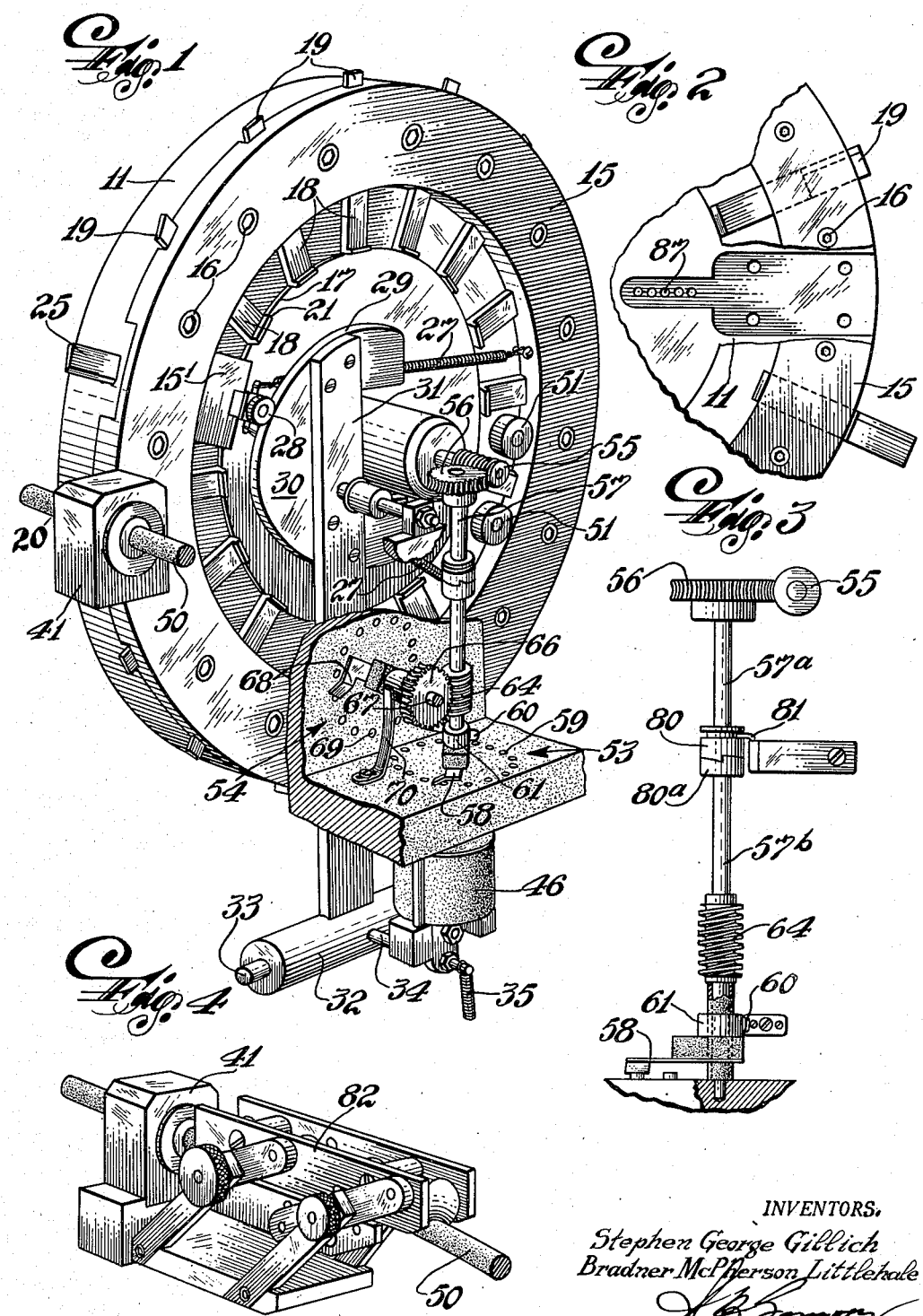
INVENTORS.
Stephen George Gillich
Bradner McPherson Littlehale
AGENT

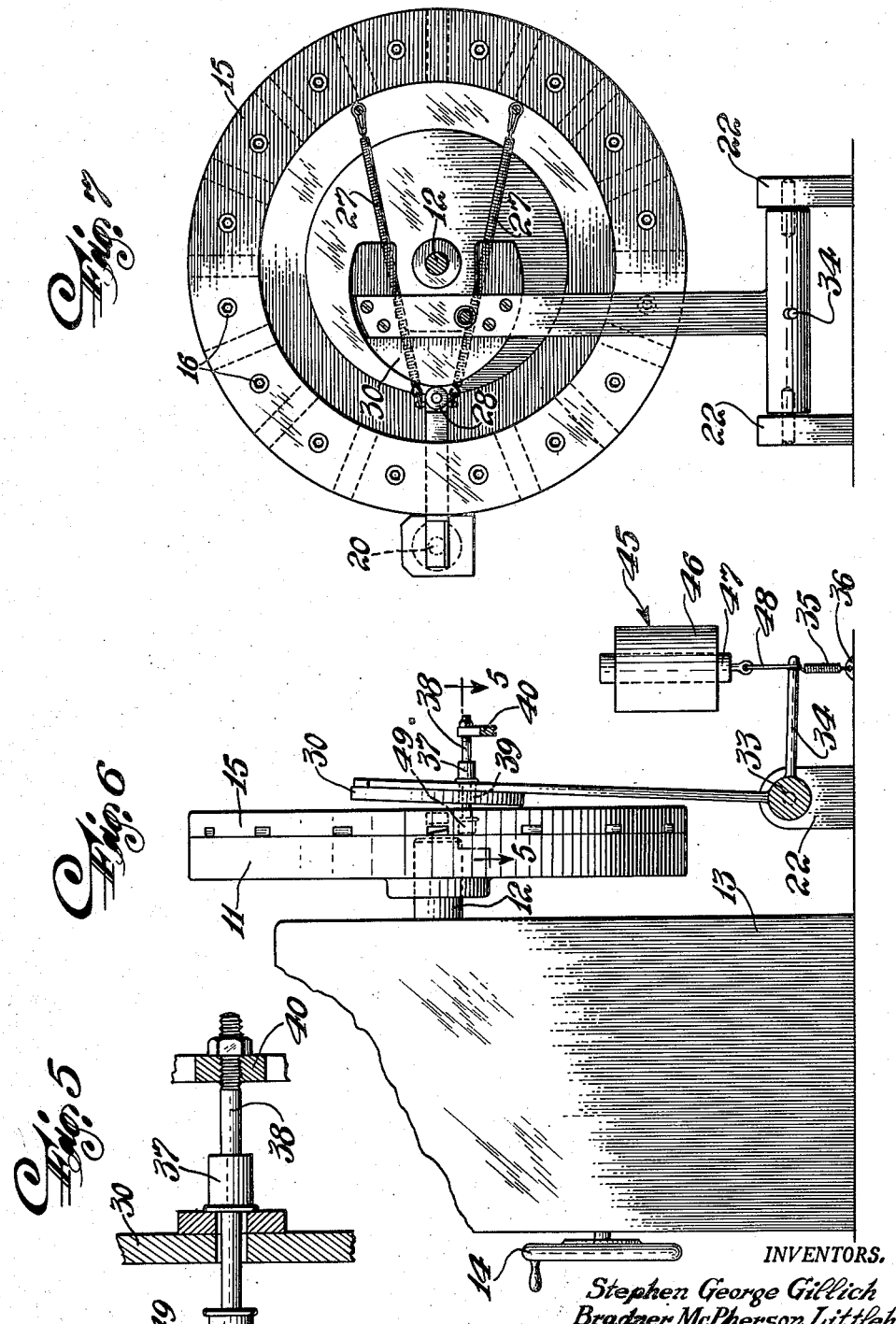

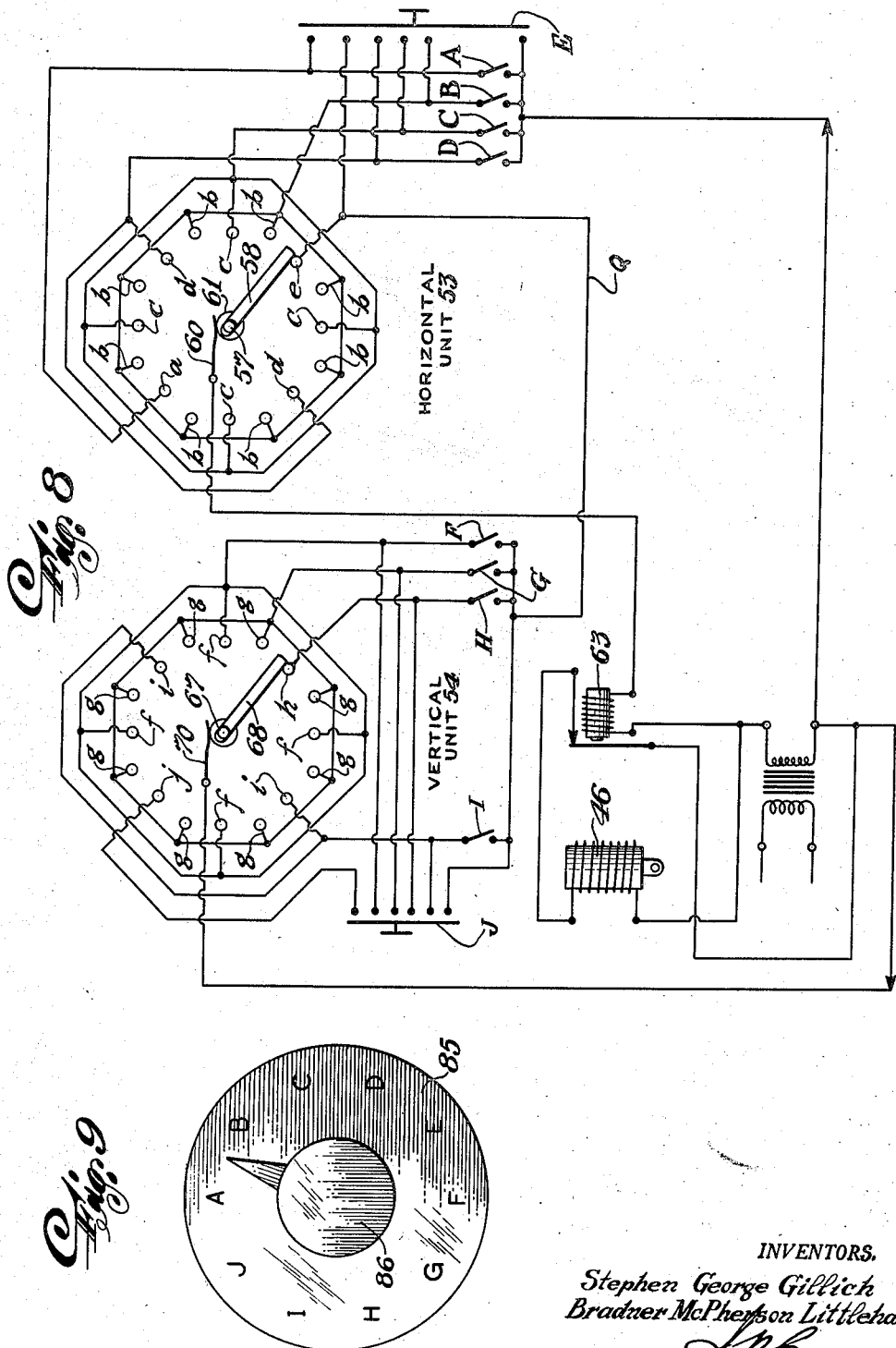

Patented Apr. 24, 1951

2,550,146

UNITED STATES PATENT OFFICE 2,550,146

VARIABLE CUTTING DEVICE

Stephen G. Gillich, Clark Township, Union County, and Bradner M. Littlehale, Cranford, N. J., assignors to Excel Tool & Die Co., Inc., Rahway, N. J., a corporation of New Jersey Application June 30, 1949, Serial No. 102,412

4 Claims. (Cl. 164—66)

1

This invention relates to a variable cutting device and is more particularly directed to a device for cutting material, fed continuously and at constant speed, into units of uniform, predetermined length. The cutting device of the instant invention is provided with controls by means of which the operator may predetermine the frequency of the cutting operation in terms of revolutions of the flywheel or other primary driving member of the device, and, together with selection of the speed at which the said primary driving member shall operate, regulate with a high degree of precision the length of the units cut.

The invention embodies a novel control mechanism whereby a single knife member may be slidably secured to the primary driving member and normally retracted from registry with the cutting station, and automatically and continuously actuated into operative position; that is, into registry with the cutting station, in predetermined ratios with flywheel revolutions (or other cycle of the primary driving member).

The material to be cut being fed at a constant linear rate past the cutting station, the length of the units cut may, for example, be increased by augmenting the ratio between flywheel revolutions and frequency of actuation of a cutter element, or by reducing flywheel speed, or both.

The operator thus may predetermine the number of flywheel revolutions per actuation of the cutter element, as, for example, either 2, 4, 8, 16, 32, 64, 128, 256, 512 or 1024 revolutions, by a simple, 10-station control system. Given the rate at which the material is fed past the cutting station and a length desired to be cut, the operator may selectively control both the frequency of cutter element actuation in terms of flywheel revolutions, and the flywheel speed, to yield precisely the desired cut length.

The invention is adapted, for example, to the cutting of extruded or other continuously fed materials. In the case of extruded plastics, the device of the invention may be positioned in series relation with the extruder and its cooling bath to immediately and continuously cut the extruded product into desired lengths. The means for feeding the material may be powered independently or from a common source, preferably the latter, to ensure synchronism in the face of line voltage variation. This may be accomplished by suitable gearing between the feeding means and the shaft of a single motor serving as a common source of mechanical power for the device as a whole.

2

In the drawings:

Fig. 1 is a perspective view of a variable cutting device embodying the invention, parts being shown fragmentarily for the sake of clarity, Fig. 2 is a fragmentary plane view, partly broken, of a portion of the flywheel and clamping ring showing fixed knives secured therebetween, one of the knives being shown in its fully retracted position, another knife being shown in its extended position, and a channel means for slidably housing a movable knife, Fig. 3 is a vertical elevational view, partly fragmentary, of the vertical shaft of Fig. 1, Fig. 4 is a fragmentary, perspective view of the cut-off bushing and guide roller unit at the cut-off station of the device, Fig. 5 is an enlarged, fragmentary, elevational view, taken on line 5—5 of Fig. 6, Fig. 6 is a side elevational view of parts of the device, Fig. 7 is an elevational view of the cam, flywheel, and clamping ring portions of the device, Fig. 8 is a wiring diagram of a control system embodying the invention, and Fig. 9 is a plan view of a dial for said control system.

As shown in the drawings, the cutting device comprises a flywheel or other primary driving member 11 keyed to the shaft 12 of a variable speed transmission device 13, of the Reeves type, which is controlled by a handwheel 14 to provide infinite variation, within a given range, of the speed of shaft 12. The clamping ring 15 may be secured to the flywheel 11 by any suitable locking means 16, such as "Allen" screws, bolts, or the like, to clamp the fixed knives 18 against the flywheel. The fixed knives are provided with outer cutting ends 19 and with inner flanges 21 or the like to abut the boss 17 of flywheel 11. When said knives are fixed between the clamping ring and the flywheel in extended position, their cutting ends 19 will move through the cutting station 20, once for each revolution of the flywheel. Thus, by securing to the flywheel in extended position a plurality of cutting knives—for example, sixteen—each of the said knives will move through the cutting station 20 once per revolution, thus yielding sixteen cuts per revolution. If, then, the flywheel is operated at maximum practicable speed and with all of the knives extended, material fed at a given rate through the cutting station will be cut to units of the shortest possible length. To reduce the length of the units cut, the flywheel may be rotated at the lowest practicable speed; the lengths of the cut units of material may be further increased by reducing the number of knives extended into operative position.

By extending only one knife, and rotating the shaft 12 at the lowest practicable speed, the longest lengths of material may be cut.

The lowest practicable speed of rotation of shaft 12, i. e., the flywheel, is dictated by the considerations of necessary momentum and the element of time consumed in the actual cutting operation, these being factors which govern the quality of cut.

Pursuant to the instant invention, the upper limit in length imposed by a cut every revolution at the lowest practicable flywheel speed is overcome by providing in the flywheel 11 a movable knife which is normally in inoperative position but may be urged automatically into operative position in intervals of more than one flywheel revolution. To that end, as shown in the drawings, a movable knife 25 is slidably positioned between the flywheel 11 and the clamping ring 15 and normally retracted to inoperative position—that is, out of the path of the cutting station 20. A plate 15' is fixed to the flywheel 11 and cooperates therewith and with the clamping ring 15 to define a channel to slidably receive the movable knife 25. The latter may be provided with suitable return stop means, as illustrated in Fig. 2 by the series of tapped bores 87 into any one of which may be screwed a stud to cooperate with the lower end of knife 25 to limit its retraction under the influence of return springs 27.

Where it is desired that the knife 25 be used alone, the fixed knives 18 are withdrawn, as shown in Fig. 1, and the cut-off bushing 41 and other parts of the cutting station are so disposed that only the knife 25 will intersect said cutting station 20 on rotation of the flywheel. Spring means 27 or the like engage the lower end of the knife 25 to normally retract it to the inoperative position. A follower 28 is secured to the lower end of the knife element 25 for engagement with the cam 30 on actuation of the latter into operative position as hereinafter described. Counterweights 51 may be secured to the flywheel at points diametrically opposed to the cutter element.

The cam 30 is movably positioned adjacent the flywheel 11 and clamping ring 15, and is normally held out of the path of rotation of the cutter follower 28, and is moved into that path to move the knife 25 to operative position at predetermined intervals of rotation of the flywheel 11 by means hereinafter described. The cam 30 is fixed to one end of arm 31, which is fixed, at its other end, to a bearing 32 pivoting on pins 33 secured in supports 22 or the like. Bearing 32 is provided with a stud 34 engaged by a spring 35 secured to a fixed anchor 36. The cam is thus held under spring tension against a stop 37 (Figs. 5 and 6) secured to the shaft 38 which passes freely through the aperture 39 in the cam and is threaded into a support 40.

By the arrangement described, as will be readily apparent from an examination of Fig. 6, cam 30 is normally held away from the flywheel 11 and out of the path of rotation of the knife follower 28. Means 45 (Fig. 6) are provided to periodically move the cam into operative position against the tension of the spring 35. Said means may be an actuator, for example, as shown in the drawings, a solenoid 46 having a plunger 47 connected to cam stud 34 by link 75

48 or the like. The cam 30 is provided with a cam surface 29 (Fig. 1) which is engaged by the follower 28 of the cutter element 25 when the solenoid is energized. The peak of the cam surface 29 is preferably concentric for a short distance to hold the cutting element radially stationary during the actual cutting cycle. It will be apparent that with all of the fixed knives 19 locked in their retracted positions, if the solenoid 46 were energized only once in a plurality of flywheel revolutions, the knife 25 would be moved to cutting position only once during such an interval, thus enabling only a single cut to be made in more than one revolution. The invention therefore may be utilized to move a knife to cutting position in such intervals as the operator may choose.

Pursuant to the invention, means are provided to energize the solenoid and hence to actuate the knife 25 at certain intervals less than once per revolution of the flywheel. Very long lengths of material 50 thus may be cut at practicable flywheel speeds. By the provision of suitable controls, the frequency of actuation of the cutter element to the number of revolutions of the flywheel may be selected and will thereafter be repeated automatically until the operator changes the control.

For that purpose, as shown in the drawings, means such as a horizontal or first control unit 53 (Figs. 1 and 8) may be provided in the circuit of the relay 63 which energizes the solenoid 46, said control unit 53 having a set of points 59 disposed in the path of rotation of a wiper arm 58 insulated from shaft 57b and which may be rotated at a speed less than one revolution to each revolution of the flywheel 11. The shaft 57 is geared to the flywheel shaft 12 through a worm gear train 55—56, for example, of the ratio of 32 to 1; the shaft 57 is, therefore, rotated once for each thirty-two rotations of the flywheel. A brush 60 constantly engages ring 61 fixed to the shaft 57.

By the use of suitable switch controls, only one of the points 59 may be placed in the relay circuit, so that once during each rotation of the shaft 57, the circuit of the relay 63 will be closed and the solenoid thus energized. Thus, the cutter element 25 wil be moved to its operative position once during each thirty-two revolutions of the flywheel shaft 12. This control system may be utilized to actuate the cutter element more frequently than once during each thirty-two revolutions of the flywheel shaft by utilizing a correspondingly greater number of points.

In the drawings, by way of example only, there are shown sixteen points 59 in the first control unit 53. During every thirty-two revolutions of the flywheel shaft 12, the vertical shaft 57 would be rotated once, completing the circuit to the solenoid sixteen times if all sixteen points 59 are connected to the relay circuit. Thus, for every thirty-two revolutions of the flywheel shaft 12, the solenoid would be energized through the relay sixteen times or once every other revolution of the flywheel shaft.

This mathematical number may be increased or decreased within practical limitations, and suitable controls may be provided, as, for example, switches A, B, C, D and E, to connect the points 59 with the solenoid circuit. Reference is made to the illustrative wiring diagram of Fig. 8, wherein the points 59 are designated as a, b, c, d, e, for facility of reference. Switch A is connected to one point a, switch B is connected to eight points b, switch C is connected to four points c, switch D is connected to two points d, and switch E is connected to all the points above mentioned (fifteen in number) and to the point e. Thus, the switch E, when closed, completes the circuit through all sixteen points 59 to relay 63.

The mathematical formula $$\frac{32}{X}$$

X being the number of points brought into the relay circuit by closing any of the switches A, B, C, D, E, as above mentioned, states the number of rotations of the flywheel shaft 12 for each movement of the knife 25 responsive to the energizing through the relay of the solenoid 46.

Additional control units may be provided to further increase the ratio of revolutions of flywheel to each movement of the knife element 25 to operative position. For example, a second or "vertical" control unit 54 may be provided. To that end, as shown in Fig. 1, the vertical shaft 57 may be provided with a worm gear 64 meshing with a worm wheel 66 on a shaft 67 disposed at right angles to the shaft 57, the shaft 67 having secured thereto a wiper arm 68 to wipe a second set of points 69, a brush 70 engaging the ring 71 keyed to the shaft 67. It will thus be apparent that on rotation of the shaft 67, an electric circuit may be completed through the brush 70, wiper arm 68 and points 69. As shown in Fig. 8, points 69 (designated as f, g, h, i, j) are wired to the switches F, G, H, I and J, which complete the circuit through the solenoid 46 as follows: switch F is wired to four points f, switch G is wired to eight points g, switch H is wired to one point h, switch I is wired to two points i, and switch J is wired to all of the above mentioned points (fifteen in number) plus the point j. For convenience of illustration, it may be assumed that the worm gears 64, 66 are such that the shaft 67 will be rotated once during each 32 revolutions of the shaft 57, or once for each 1024 revolutions of the flywheel shaft 12. The formula $$\frac{1024}{X}$$

X being the number of points brought into the solenoid circuit by the closing of the switches F, G, H, I or J, states the ratio of revolutions of flywheel shaft 12 to each movement of the knife 25 into operative position.

The worm 55 and worm wheel 56 are so engaged as to provide the desired timed relation between the position, angularly, of follower 28 and wiper arm 58, whereby incipient contact of the wiper arm with any of points 59 precedes the incidence of follower 28 upon cam 30. Further, the diameter of the points 59 is selected to provide a wiper dwell sufficient to hold cam 30 in operative position only for the requisite degrees of arc of flywheel rotation. To provide a standard dwell in terms of degrees of arc of flywheel rotation, any of the heretofore described additional control units are so wired as to actuate the relay 63 through the so-called horizontal or first unit 53, as illustrated in Fig. 8, connection Q, whence it will be apparent that any combination of points utilized on vertical unit 54 ultimately establishes the relay circuit through point e on the horizontal unit 53. The necessity for this arrangement will be the more readily appreciated by a consideration of the fact that in view of the exemplary ratio of 32:1 between shafts 67 and 57, the dwell upon any of its associated points of wiper 68 is thirty-two times as long as that of wiper 58 on its points.

The speed reduction effected by the worm gears 64, 66 may be readily varied from the number suggested above, within the scope of the instant invention, as may also be the number of points provided. The switches A, B, C, D, E, F, G, H, I, J may be incorporated in a single switch unit 85 having a control knob 86, as shown in Fig. 9, as will be readily apparent, so that the operator may rapidly and accurately set the ratio of revolutions of the flywheel shaft to each movement of the knife 25 into operative position. Thus, he may provide for the automatic repeated cutting of the material 50 into predetermined lengths. The relationship of material feed rate, length desired to be cut, flywheel revolutions per cut and flywheel speed may be plotted graphically to provide a ready reference for the operator in selecting appropriate settings.

To prevent reversal of rotation of wiper arms 58 and 68 when flywheel 11 is so rotated manually during knife adjustments, and to provide a means for rendering stationary said wiper arms when the control units 53 and 54 are out of use, the shaft 57 (see Fig. 3) advantageously may be divided into sections 57a, 57b and connected by elements 80, 80a affixed to the said shaft sections to form a unidirectional clutch. Element 81, engaging the annular groove in element 80, when urged counter-clockwise holds the clutch elements in operative relation and, likewise, when urged clockwise raises element 80 along a keyway on member 57a, thereby effecting disengagement of the clutch.

The material 50 to be cut pursuant to the instant invention may be fed through the cut-off bushing 41, or other means to guide the same through the cutting station 20 of the device; a roller unit 82 (see Fig. 4) may be provided to further guide the material.

The guide roller assembly may, as shown in Fig. 4, comprise horizontally spaced pairs of rollers which may be adjusted to conform to the diameter of material fed therethrough; the outlines of the rollers may be similarly conformed to the configuration of such material.

The cut-off bushing 41 may be positioned at various points radially along the cutting edge of the cutting knives. Thus, when cutting small diameter material, the wear will be distributed along the full length of the cutting edge of the knife.

The device of the invention enables the operator to make adjustments to provide a very wide range of lengths of material to be cut automatically, in a rapid and accurate manner. The device utilizes the momentum of the flywheel to maintain constancy of speed, and a relatively high peripheral speed for clean and accurate cutting of all lengths.

It will be apparent that the number of units of contacts and wiper arms geared to the shaft 12 to effect the ratios above mentioned may be increased from the two shown (53, 54) in the drawings and described above, to such number as may be desired to suit the requirements of the user. In the control mechanism described above utilizing two such units which have been designated "horizontal unit" and "vertical unit," in Fig. 8, the operator may, by utilizing a 10-station switch 85 of Fig. 9, or 10 separate switches, shown in Fig. 8 (A–J inclusive), set a control such that knife 25 will be moved out to operative position to cut the material 50 once every 2, 4, 8, 16, 32, 64, 128, 256, 512, or 1024 revolutions of the flywheel.

The term "flywheel," used to designate the primary member 11 moving in continuous rotative cycles during operation of the device, shall include other continuous-cycle primary moving members, such as reciprocating members and the like.

The machine may be used to iut lengths of materials such as extruded rubber, cork, and thin metal. The term "knives," as used herein, shall be deemed to include punches and similar cutting tools. Punches may be used in place of cutting knives or elements where it is desired to notch plastic or metal strip. The high speed production of simple shapes, notched from either metal or plastic strip, may be obtained pursuant to the invention by substituting a die element for the cut-off bushing 41. The material would be fed across the top of the die element and the punches would rotate through at the desired speed to afford a minimum of scrap. Combined notching and cut-off operations could be used to produce special types of extruded belting, and for similar operations. These and other adaptations of the invention will become apparent from a consideration of the disclosure herein; such adaptations are within the scope and purview of the invention.

Having thus described our invention, what we claim as new and desire to secure by Letters Patent is:

1. In a variable cutting device, for cutting lengths of material fed past said device, a primary member movable in continuous cycles, a knife, means to secure the knife to the primary movable member, for movement in unison therewith, a cam member, a solenoid connected to said cam member and adapted, when energized, to actuate the cam into engagement with the knife to move the latter to operative position for cutting said material, and means to energize said solenoid at frequencies of more than one cycle of movement of the primary movable member.

2. In a cutting device having a cutting station, a revolving primary driving member, a knife slidably secured thereto, an electrical cam actuator, a cam adapted, when actuated, to be engaged by and slide the knife to operative position relative to the cutting station, and means between the primary driving member, driven thereby, and the cam actuator, to energize the latter in predetermined frequency to revolutions of the primary driving member, to actuate the knife at such predetermined frequency.

3. In a cutting device having a cutting station, a primary driving member movable in cycles, a knife slidably secured thereto, an electrical cam actuator, a cam adapted, when actuated, to be engaged by and slide the knife to operative position relative to the cutting station, one or more electrical points, switch means to selectively connect said points to the circuit of said cam actuator, and means driven by said driving member in synchronism therewith but at lesser speed, engaging said points to complete said circuit and thereby actuate the cam in timed frequency to cycles of movement of the movable member.

4. The cutting device of claim 3 wherein the means driven by said driving member comprises a shaft having two sections, complementary clutch elements secured to said sections to connect the same, and means to normally hold said clutch elements engaged.

STEPHEN G. GILLICH.
BRADNER M. LITTLEHALE.

REFERENCES CITED

The following references are of record in the file of this patent:

UNITED STATES PATENTS

| Number | Name | Date |
| --- | --- | --- |
| 1,844,660 | Kastel | Feb. 9, 1932 |
| 1,876,838 | Biggert, Jr. | Sept. 13, 1932 |
| 2,445,174 | Hannewald et al. | July 13, 1948 |

FOREIGN PATENTS

| Number | Country | Date |
| --- | --- | --- |
| 23,061 | Great Britain | Oct. 29, 1908 |